UNITED STATES PATENT OFFICE.

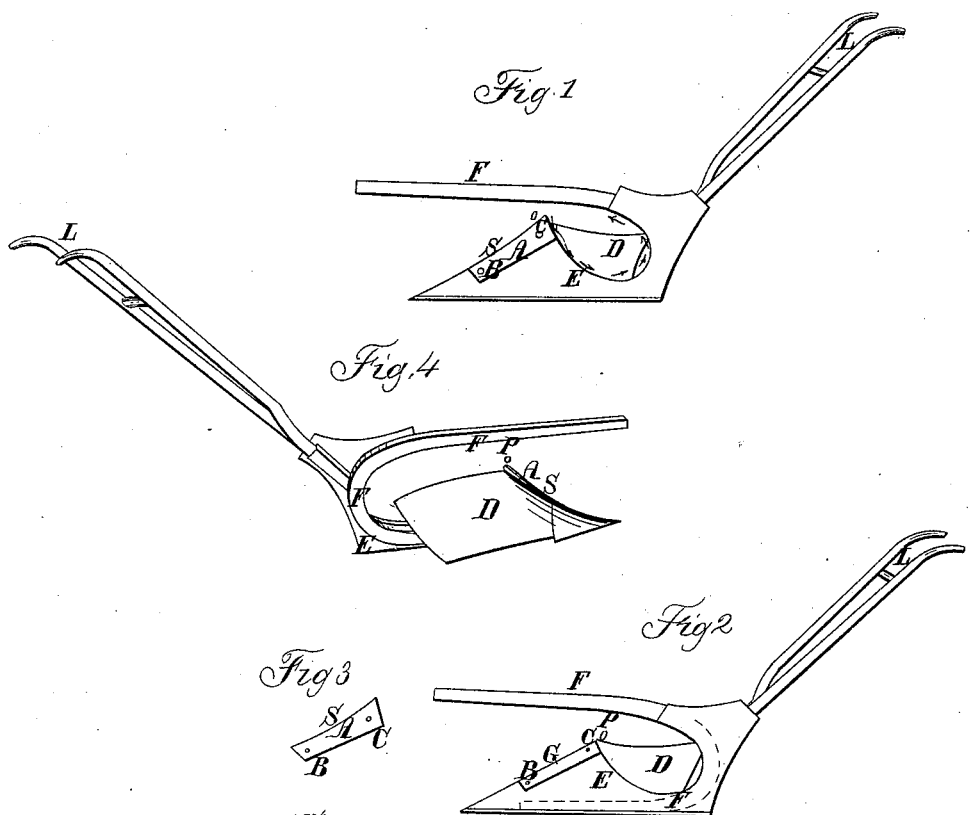

JAMES M. DICK, OF BUFFALO, NEW YORK.

IMPROVEMENT IN PLOWS.

Specification forming part of Letters Patent No. 37,740, dated February 24, 1863.

*To all whom it may concern:*

Be it known that I, JAMES M. DICK, of Buffalo, in Erie county, and State of New York, have invented certain new and useful Improvements in Plows; and I declare that the following is a full and exact description of the same, reference being had to the accompanying drawings and the letters of reference marked thereon.

The same letters in Figures 1, 2, 3, and 4 represent similar parts in each.

The nature of my invention consists in providing a plow with a curved beam so attached as to leave an open space between the front of the plow and the beam for the passage of roots, grass, weeds, &c., and at the same time strengthen the landside sufficiently to resist the whole pressure or strain brought to bear upon it in consequence of its being deprived of the usual front connection, and, in connection therewith, so attaching the colter to the plow as not to obstruct or otherwise interfere with the open space alluded to.

To enable others skilled in the art to make and use my invention, I will proceed to describe its construction and operation.

I construct my plow of cast-iron or other suitable material. Steel would be preferable.

Fig. 1 is a side elevation representing the open space between the point O of the colter and the point P of the beam. The shape of this open space is shown by the arrows in said Fig. 1. A represents the colter, which is bolted on at the points B and C, and is placed in the position shown so as to give a sliding cut while passing through the soil.

Fig. 2 represents a similar view of the plow, with the colter A detached. G shows the place for the colter.

Fig. 3 represents the colter, which is made of cast-steel and sharpened at its upper edge, S.

Fig. 4 is a perspective view of the plow, showing its opposite side, also the beam F, which is bent in the form of the letter U and passes down and along the inside of the landside, as shown by dotted lines in Fig. 2, thus giving strength. D is the mold-board; A, the colter.

The beam is made of either cast or wrought iron. Wrought-iron may be preferred, but all the strength necessary may be got from cast-iron, as it requires much less power to draw it than the plows in common use.

I do not claim, broadly, attaching the beam to the rear portion of the landside; but

What I claim, and desire to secure by Letters Patent, is—

The combination of the curved iron beam F, attached to the landside E, as shown and described, with the mold-board D and the share A, or cutting part of the plow, when the whole are constructed and arranged as herein described and set forth.

JAMES M. DICK.

Witnesses:
 JAMES SANGSTER,
 WM. H. DICK.